US008375572B2

(12) United States Patent
Lind et al.

(10) Patent No.: US 8,375,572 B2
(45) Date of Patent: Feb. 19, 2013

(54) METHOD FOR CREATING A SILICONE ENCASED FLEXIBLE CABLE

(76) Inventors: Howard Lind, Porter Ranch, CA (US); John Palahnuk, Valencia, CA (US)

( * ) Notice: Subject to any disclaimer, the term of this patent is extended or adjusted under 35 U.S.C. 154(b) by 505 days.

(21) Appl. No.: 12/629,804

(22) Filed: Dec. 2, 2009

(65) Prior Publication Data

US 2010/0072656 A1 Mar. 25, 2010

Related U.S. Application Data (63) Continuation-in-part of application No. 12/119,199, filed on May 12, 2008, now Pat. No. 7,678,998.

(51) Int. Cl.
*H01R 43/00* (2006.01)
(52) U.S. Cl. ........... 29/825; 29/831; 29/841; 29/848; 29/855; 29/856; 264/167; 264/272.14
(58) Field of Classification Search .......... 29/825, 29/830, 831, 841, 846, 848, 854–856; 174/47, 174/15.7, 95; 264/167, 171.13, 272.14, 272.17; 362/84, 249.02, 294, 391, 800
See application file for complete search history.

(56) References Cited

U.S. PATENT DOCUMENTS

| 3,098,892 A * | 7/1963 | Spade et al. .................. 174/47 |
| 6,977,055 B2 * | 12/2005 | Gallant et al. ............... 264/167 |
| 2009/0237912 A1 * | 9/2009 | Tsai et al. .................... 362/84 |

* cited by examiner

*Primary Examiner* — Thiem Phan
(74) *Attorney, Agent, or Firm* — Edmond Defrank (57) ABSTRACT

The embodiments disclose a method for creating a silicone encased flexible cable using manufacturing machinery including automatically arranging plural individual conduits, into custom grouped arrangements including electrical wiring, pneumatic tubing and fluid tubing, inserting the custom grouped arrangements including connectors and flexible silicone junction devices into a shaped silicone encasement extrusion apparatus, depositing a mixture of silicone and additives to the custom grouped arrangements encasement using the extrusion apparatus, customizing the mixture of silicone and additives to create differing characteristics of the custom grouped arrangements, using the extrusion apparatus to create a singular encasement and to cure the singular encasement to a desired shape of the custom grouped arrangements and integrating one or more encased flexible junction box to the custom grouped arrangements, wherein the one or more flexible junction box contains at least one incoming and two outgoing conduit connections and one or more functional devices.

9 Claims, 11 Drawing Sheets

1. <u>Hybrid Cable:</u>

METHOD FOR CREATING A SILICONE ENCASED FLEXIBLE CABLE

RELATED CASES

This application is a continuation-in-part of U.S. patent application Ser. No. 12/119,199, filed on May 12, 2008 now U.S. Pat. No. 7,678,998 by Lind et al., and entitled "CABLE ASSEMBLY".

BACKGROUND

Many applications and devices require multiple communication cables, optic fibers, junction devices, tubes or flexible piping, electrical conductors and/or other groupings of flexible transmitting, receiving or conveyance systems methods generally which require individual installations of the runs. The cables and other systems can become tangled. The cables and other systems may be damaged by excessive abrasive movement, kinking or contaminated from exposure to internal and outside contaminates. Initial installations and subsequent maintenance can become difficult to separately pull or extract these systems through the space available.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview:

It should be noted that the descriptions that follow, for example, in terms of cables, conductors and flat shapes are described for illustrative purposes and the underlying flexible silicone systems shaped encasement technology can apply to any desired similar or mixed groupings of flexible transmitting, receiving or conveyance systems of varying sizes in any desired shape. In one embodiment of the present invention, groupings of communications cables and electrical conductors can be processed into a flat shaped silicone encasement, in another embodiment of the present invention, groupings of optic fibers, electrical conductors and tubing conveying a fluid can be processed into a round shaped silicone encasement.

Figure 1:
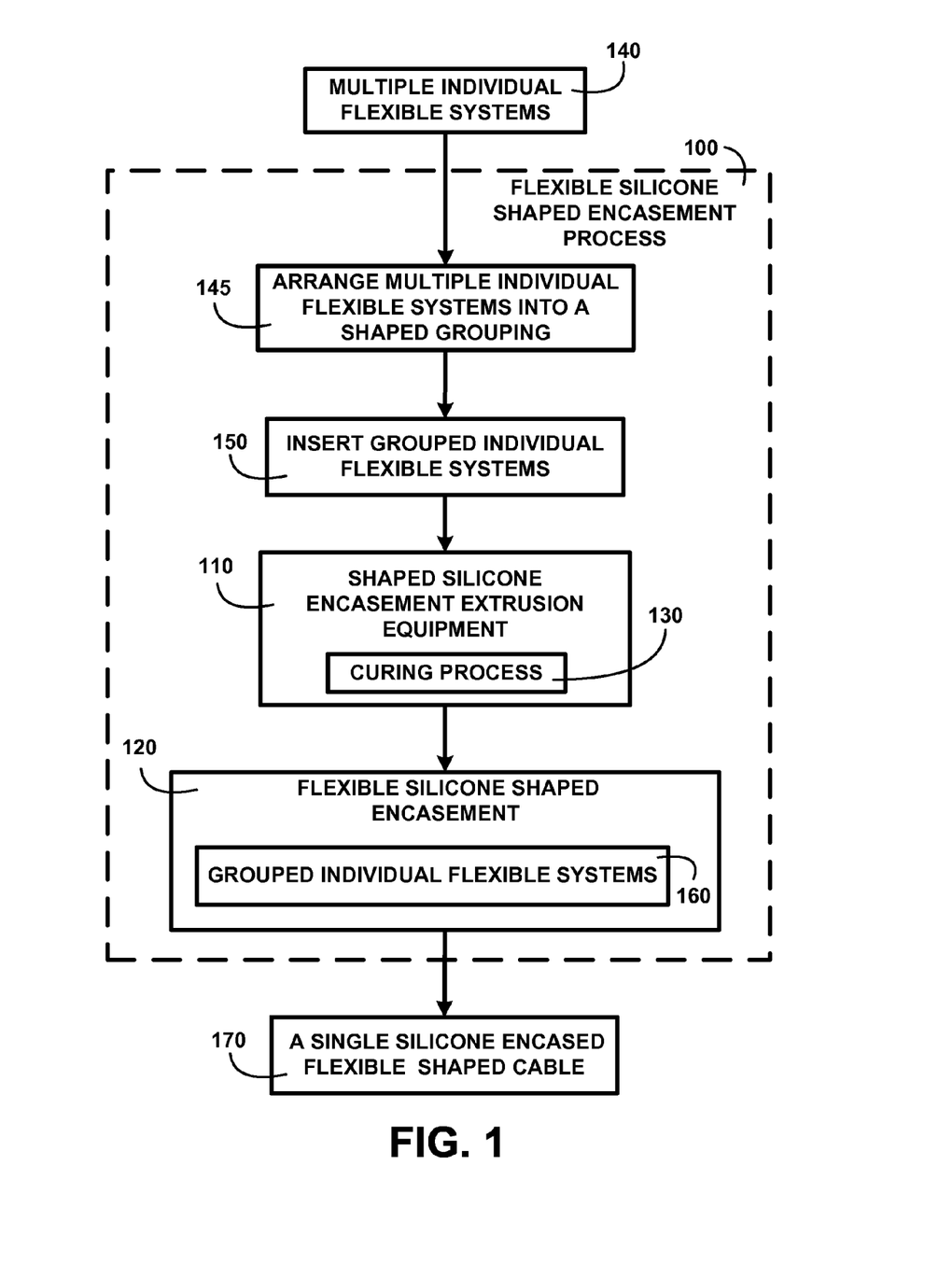
FIG. 1 shows a block diagram of an overview of a method for processing a single silicone encased flexible shaped multiple systems cable of one embodiment of the present invention.

FIG. 1 shows a block diagram of an overview of a method for processing a single silicone encased flexible shaped multiple systems cable of one embodiment of the present invention. FIG. 1 shows an overview of a method to arrange various numbers and types of multiple individual flexible systems 140 into a singular custom shaped grouping. The arrangement forms a shape to make more efficient use of available installation routing space within a larger device or series of devices. The present invention provides a method in which the desired efficient arrangement is held in place by encasing the arranged groupings in flexible silicone. The method provides a flexible silicone shaped encasement process 100 to assemble the multiple individual flexible systems 140. The process starts when multiple individual flexible systems 140 are grouped into the desired arrangement. An initial phase in the flexible silicone shaped encasement process 100 is to insert grouped individual flexible systems 150 into shaped silicone encasement extrusion equipment 110. The shaped silicone encasement extrusion equipment 110 deposits a mixture of silicone and proprietary additives around the grouped arrangement of systems creating an encasement in the desired shape. The encased grouped individual flexible systems 160 continue through a curing process 130 to set and thus maintain the desired shape. The result is a single encased flexible shaped cable 170 in continuous lengths or as assemblies of one embodiment of the present invention.

The single cable can now be installed in the routing space for which it was shaped in lieu of multiple individual installations of the various types of systems through the same space. Multiple individual installations can be complicated by tangled individual systems cables and tubes. The custom shaping allows for very precise cable routing without folding, kinking or pinching which can cause damage to the individual systems and lead to systems failures. For example, stress from excessive pulling tension to overcome the friction and pinching due to tangled, overlapping prior installations can cause stretched or broken wires. The flexible silicone shaped encasement 120 provides protection to the individual systems during installation and further protection from contamination after installation for example from air born dust or water vapor.

An example of an application of the single encased flexible shaped cable 170 is use in aerospace and jet aircrafts which create some of the most demanding environments for electrical circuitry, characterized by high vibration, shocks and extreme temperatures. Each new generation of aircraft increases the demands. Features of the single encased flexible shaped cables address these issues with the highest flexibility, the ability to be shaped to fit very tight spaces, low weight, and a very broad temperature range. In addition the extrusion process used to manufacture the single encased flexible shaped cables produces a one-piece silicone encapsulation that will not delaminate or degrade due to vibration or exposure to oils or chemicals.

The use of a single silicone encased flexible shaped cable reduces installation time, reduces or prevents damage to individual systems during installation and provides protection after installation enabling reliable performance and long life of one embodiment of the present invention.

DETAILED OPERATION OF THE INVENTION

Figure 2:
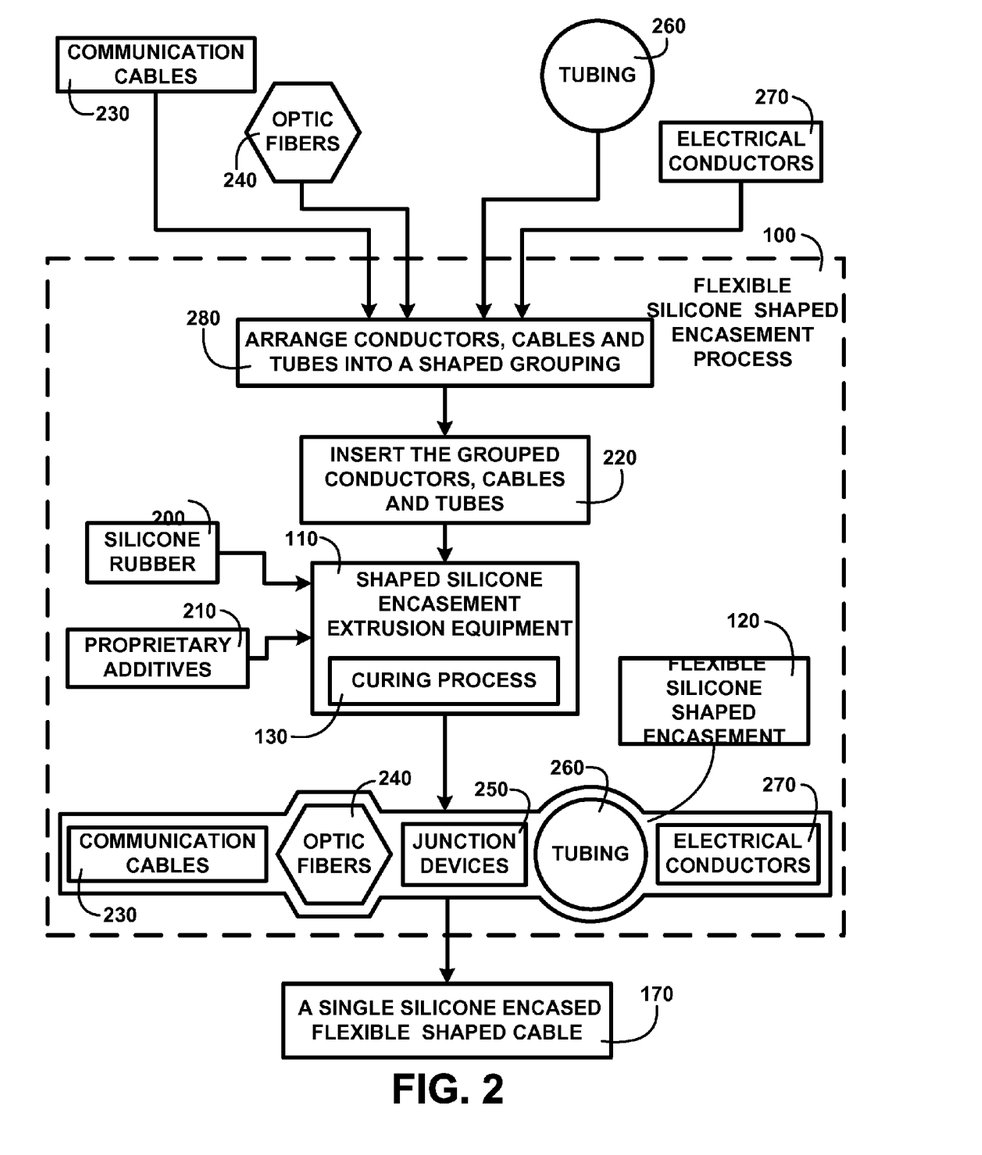
FIG. 2 shows a block diagram of an example of the flexible silicone systems shaped encasement process of one embodiment of the present invention.

The Process:

FIG. 2 shows a block diagram of an example of the flexible silicone systems shaped encasement process of one embodiment of the present invention. FIG. 2 shows an initial phase in the flexible silicone shaped encasement process 100 which gathers the separate individual flexible systems for example communication cables 230, optic fibers 240, tubing 260 and electrical conductors 270 to arrange conductors, cables and tubes into a shaped grouping 280. The process continues to insert grouped conductors, cables and tubes 220 into shaped silicone encasement extrusion equipment 110. Also, strengthening members, such as ballistic materials and metallic wires can be added to the cable.

The shaped silicone encasement extrusion equipment 110 deposits silicone rubbers 200 mixed with proprietary additives 210 around the grouped conductors, cables and tubes creating a flexible silicone shaped encasement 120 in the desired shape. The shaped silicone encasement extrusion equipment 110 can be configured to create flexible silicone junction devices 250 along the length of the encasement for extensions or branch circuits. The encased group continues through a curing process 130 to set and thus maintain the desired shape. The result is a single silicone encased flexible shaped cable 170 of one embodiment of the present invention.

Systems Included:

The flexible silicone shaped encasement process 100 can include for example pneumatic tubing, multiple twisted conductors, shielded conductors, single conductor, optic fibers and coax. Where fluids or pneumatics are desired for an application, these systems for example can be integrated with electrical wiring in one compact cable, versus using multiple cables, tubes and wires. Hollow tubing for example PFA, PVC, PTFE, or Tygon of varying diameters, wall thicknesses, and inner diameter openings, can be combined with electrical conductors in the flexible silicone shaped encasement, thereby enabling all manner of liquids and gases to flow through the same flexible silicone shaped cable as electrical signals of one embodiment of the present invention.

The flexible silicone shaped encasement process 100 allows precisely controlling the spacing of component systems such as wires and conduit, the insulation thickness, and the overall cable shape. The control of the insulation thickness allows inclusion of single, twisted or other conductor wire gauges for example from 4 to 44 AWG. The flexible silicone encapsulation provides extreme flexibility for motion applications. The silicone encased flexible shaped cables can seamlessly be attached to, for example, fixed and moving structural components and can be used for carrying electrical signals, light signals, pneumatics, and fluids exactly where they are desired for use in the application. Combining each of the systems into one cable results in a cleaner, more compact design, which can ultimately be more reliable and cost-effective. The extrusion process can produce silicone encased flexible shaped cables in continuous lengths or as assemblies, complete with connectors and junction boxes, then tested and inspected for a specific application. This capability provides the ability for customizing cables to be shaped to fit very tight spaces of one embodiment of the present invention.

Proprietary Additives:

The mixture of silicone rubber 200 with proprietary additives 210 allows adaptation of the silicone encased flexible shaped cables to numerous applications. Various proprietary additives 210 can be mixed with the silicone rubber 200 prior to extrusion, in controlled amounts, that create functional advantages to the silicone encased flexible shaped cables. These proprietary additives 210 can include for example elements to modify the hardness of the cable encasement to increase or decrease flexibility, and to, creating different functional characteristics for different purposes. For example, harder cable encasements will last longer in abrasive environments, and softer cable encasements will have more flexibility. In addition, softer cable encasements can be used as a sealing mechanism in an assembly. The softer cable encasement can itself be, for example, compressed between two mating surfaces and the silicone encasement of the cable creates a seal between the surfaces of one embodiment of the present invention. Yet another example is the addition of graphite or other conductive materials, thereby making the silicone encapsulation electrically conductive.

Controllable Adaptive Characteristics:

The adaptive characteristics of the controllable mixture of silicone rubber 200 with proprietary additives 210 allows processing of silicone encased flexible shaped cables that can be for example used in a single axis design that may be ganged for 1, 2 or 3 axes of servo motion. The silicone encapsulation provides a solid, one-piece construction that creates a highly durable cable package. The cable will not deform, break or wear during an extended lifetime of use, even under high flex conditions. The adaptive silicone process also delivers advantages in extreme environments, including for example a very broad temperature range extending from −65° F. to +260° F. The cables are also impervious to water, steam and chemicals. The extrusion process used to manufacture the silicone encased flexible shaped cables produces a one-piece silicone encapsulation that will not delaminate or degrade due to vibration or exposure to oils or chemicals of one embodiment of the present invention.

Applications:

The solid construction makes the cables for example well suited for vacuum or clean rooms environments. The controllable adaptive features and characteristics of the custom silicone encased flexible shaped cable assembly process allow tailoring cables for use for example in aerospace, avionics, and robotics applications. The adaptive capability of the flexible silicone shaped encasement process 100 is well suited to ongoing efforts by various industries to achieve miniaturization and space efficiency. The custom silicone encased flexible shaped cable assemblies can for example be used in medical diagnostic equipment, motion control robotics, marine electronics and automotive applications and are compatible with all electronics connectors, including custom PCB components of one embodiment of the present invention.

Aerospace and Military Jet Aircraft Applications:

The flexible flat silicone cables can be used in subsystems for aerospace and military jet aircraft for applications that include targeting pods, fuel control systems and missile gimbals and guidance systems. This is because aerospace and jet aircrafts have always created some of the most demanding environments for electrical circuitry, characterized by high vibration, shocks and extreme temperatures. Each new generation of aircraft increases these demands. The silicone encased flexible shaped cable process can customize the characteristics in the cable assemblies produced to address these issues with high flexibility, the custom shaping to fit very tight spaces, low weight, and broad temperature ranges. The one-piece silicone encapsulation produced by the extrusion process and resulting lack of delaminating or degrading due to vibration or exposure to oils or chemicals make these silicone encased flexible shaped cables well suited to the extremes of an aviation environment of one embodiment of the present invention.

The reduction from installation stress damage provided by the custom shapes and continuing damage prevention provided by the integral silicone encasement protection contribute to the elimination of signal failures due to physical stress at the cable connector. The high level of reliability provided by the flexible silicone shaped encasement process 100 of FIG. 1 is extremely desirable for compact avionics and other modular electrical systems. The high level of reliability provided by the flexible silicone shaped encasement process 100 of FIG. 1 is reinforced by inclusion in the process rigorously testing the systems included in each cable including 100% testing for electrical performance. The process rigorous testing allows the cable assemblies to meet industry quality standards for example ISO 9001 and AS 9100 Aerospace standards of one embodiment of the present invention.

Miniature Silicone Cables for Medical Applications:

The custom silicone encased flexible shaped cable assemblies can for example be used in medical and other compact electronics including sophisticated devices such as infusion pumps, auto-injection systems, and advanced surgical instruments. For example in these applications to be re-used, the device has a prerequisite to withstand the rigors of autoclaving, alcohol washes, chlorine bleach baths, and other sterilization procedures. Where bodily contact is a factor hypoallergenic materials are to be used, and all wires or probes must be soft to the touch. The customized silicone encased flexible shaped cable assemblies meet all these requirements. The cable assemblies are made of inert, hypoallergenic grade silicone and are compatible with all medical connectors. The cable assemblies can easily withstand temperature extremes and chemical sterilization without becoming brittle or degrading. The silicone mixtures used can be controlled to be extremely flexible and soft to the touch, allowing the cables to be used in direct contact with the human body. In addition, the customized silicone encased flexible shaped cable assemblies can be provided in FDA approved versions, for human implant applications.

Shipboard and Marine Applications:

Silicone encased flexible shaped cables deliver extreme flexibility and exceptional environmental protection, including superior water resistance. Inherent water repellent characteristics make silicone encased flexible shaped cables impervious to immersion, high humidity, fungus, and damp operating environments, making them ideal for wash down, autoclave, and other wet applications. Conversely, extremely dry conditions or low humidity will not affect the cable's flexibility or life. In addition, these cables are highly resistant to the corrosive effects of salt spray or seawater exposure, meeting all applicable specifications for shipboard use and marine environments. The flexible silicone shaped encasement process 100 produces space saving low weight cables of the highest flexibility and reduces the complexity of current cabling installations of one embodiment of the present invention.

Figure 3A:
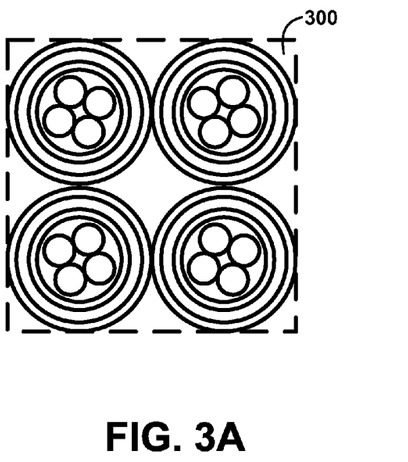
FIG. 3A shows an illustration of an example of the space occupied for round cable installations of one embodiment of the present invention.

Cable Space Reduction:

FIG. 3A shows an illustration of an example of the space used for round cable installations of one embodiment of the present invention. FIG. 3A shows an illustration of an example of the space occupied for four round cables 300. Round flex cables feature insulated wires in a bundle which is surrounded by several layers of other material. Packing density of flat cable is higher than is possible with round cables. The round shape of the adjacent cables causes space to be unused due to the opposing curved surfaces of one embodiment of the present invention.

Figure 3B:
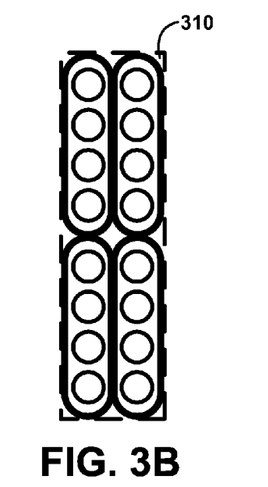
FIG. 3B shows an illustration of an example of the reduced space occupied for installations of flexible silicone systems encasements in flat shaped cables of one embodiment of the present invention.

FIG. 3B shows an illustration of an example of the reduced space occupied for installations of flexible silicone systems encasements in flat shaped cables of one embodiment of the present invention. FIG. 3A shows an illustration of an example of the use of flat cables such as the silicone encased flexible shaped cables which when placed adjacent on the flat surfaces produces reduced space to place four flat cables 310. This reduction in space requirement can be a significant benefit for cable installations in applications involving complex or miniaturized devices of one embodiment of the present invention.

Figure 3C:
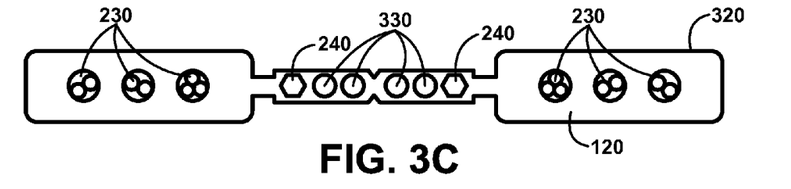
FIG. 3C shows an illustration of an example of flexible silicone systems in a flat shaped cable encasement of one embodiment of the present invention.

FIG. 3C shows an illustration of an example of flexible silicone systems in a flat shaped cable encasement of one embodiment of the present invention. The illustration of an example of a flat silicone encased flexible shaped cable in FIG. 3C includes communication cables 230, optic fibers 240 and tubes 330 in a flexible silicone shaped encasement 120 to form a flat shaped cable 320. Also, each of these sections, such as optic fibers 230, can be split off from other sections by creating an indent between each separate individual section during manufacturing.

The flat flexible silicone shaped cables make more efficient use of insulating material. These flat cables need no low-friction tapes and fillers because conductors don't move within the silicone material that forms the outer jacket. And when bent in the plane of its thin cross section, these flat cables have inherently more flexibility than round cable. The flat form factor of cables also provides better heat dissipation than round cables because there is more surface area for a given volume. The larger surface area lets flat cables carry a higher current level for a given temperature rise and for conductors of a given cross section. Conductors in flat cable also have a fixed geometry that makes for consistent and non-varying electrical qualities. The spacing of conductors in the extruded silicone never changes as the cable moves. Thus cable impedance, inductance, capacitance, time delay, crosstalk, and attenuation all remain constant. Also, the conductors in the cable all have the same physical and electrical length. This physical relationship, coupled with the fact that the dielectric dimensions stay constant, means that signal skewing and differential time delays between signals in the cable stay at a minimum. Flexible silicone systems encased flat shaped cables inherently form a high-density interconnect system. The fact that conductors can be visible through the clear silicone extrusion simplifies coding, inspection, and tracing circuits for trouble shooting of one embodiment of the present invention.

Figure 3D:
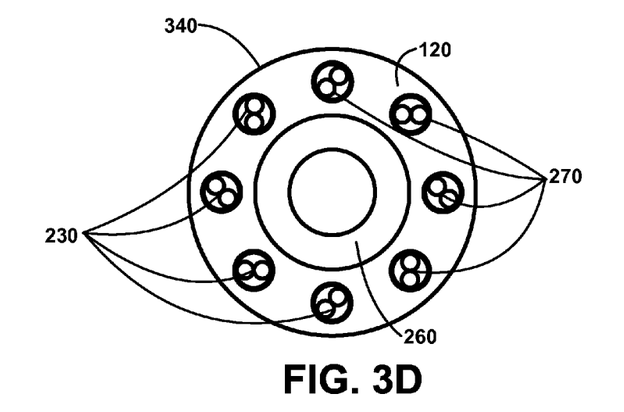
FIG. 3D shows an illustration of an example of a hybrid flexible silicone systems encasements in round shaped cable of one embodiment of the present invention.

FIG. 3D shows an illustration of an example of a hybrid flexible silicone systems encasements in round shaped cable of one embodiment of the present invention. While multiple round cables occupy more space than flat cables the flexible silicone shaped encasement process 100 of FIG. 1 allows multiple round cables and tubes to be grouped together and encased to form a single round cable, thus reducing the space normally lost for use using multiple round cables. Shown in the illustration of FIG. 3D is an example of a flexible silicone systems encasement forming a round shaped hybrid cable 340. The round shaped hybrid cable 340 groups communication cables 230, tubing 260 and electrical conductors 270 in a single flexible silicone shaped encasement 120. This adaptation allows efficient use of space where a round shape is desired or fits the space available for the cable installation of one embodiment of the present invention.

Examples of Various Silicone Encased Flexible Shaped Cable Configurations:

The profile of silicone encased flexible shaped cables is in part determined by the space available for the installation of the finished cable and the component systems to be grouped within the cable. The outside profile of the cable, including the positioning of the cable elements, and the thickness of the silicone jacketing, can be precisely controlled. This allows the creation of separate cable 'pods' or sections within the overall cable, which can be split off or peeled away from the main cable, as desired for wire routing purposes. Shown for illustrative purposes only in FIGS. 4A, 4B, 4C and 4D are different profiles of examples silicone encased flexible shaped cables of one embodiment of the present invention.

Figure 4A:
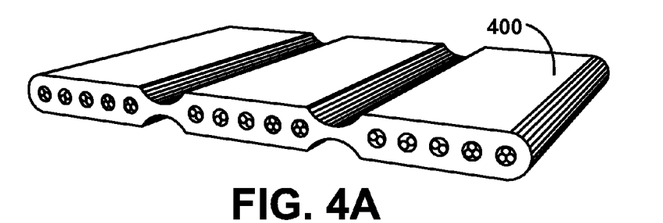
FIG. 4A shows an illustration of an example of cable pods in a flat cable of one embodiment of the present invention.

FIG. 4A shows an illustration of an example of cable pods in a flat cable of one embodiment of the present invention. The illustrative example shown in FIG. 4A includes three cable pods of five cables each in a flat cable 400 of one embodiment of the present invention.

Figure 4B:
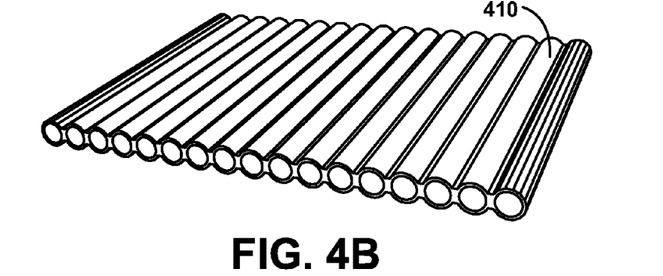
FIG. 4B shows an illustration of an example of multiple cables and tubes in split flat cable of one embodiment of the present invention.

FIG. 4B shows an illustration of an example of multiple cables and tubes in split flat cable of one embodiment of the present invention. The illustrative example shown in FIG. 4B includes multiple cables and tubes in a flat cable 410 that can be split into branch runs along the connecting silicone material between the cables and tubes of one embodiment of the present invention.

Figure 4C:
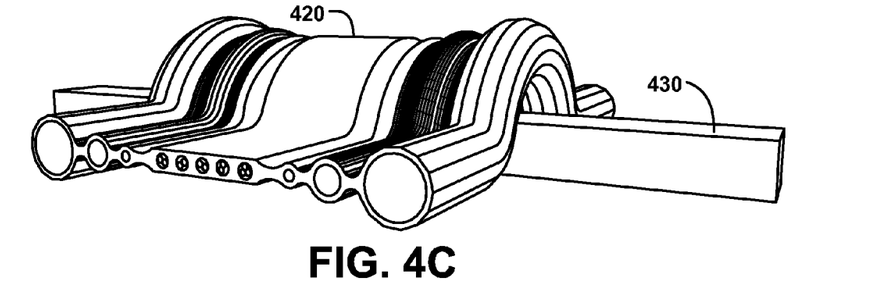
FIG. 4C shows an illustration of an example of a mixed flexible flat cable routed over obstacle of one embodiment of the present invention.

FIG. 4C shows an illustration of an example of a mixed flexible flat cable routed over an obstacle of one embodiment of the present invention. The illustrative example shown in FIG. 4C includes a mixture of various sized tubes and cables encased in a soft highly flexible silicone encasement. The flexibility of the cable is demonstrated by showing the mixed flexible flat cable 420 being routed over an obstacle 430 in the device cable route of one embodiment of the present invention.

Figure 4D:
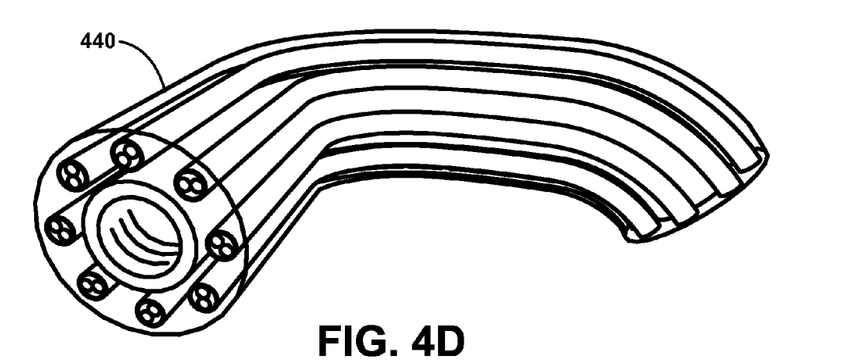
FIG. 4D shows an illustration of an example of a hybrid round flexible cable of one embodiment of the present invention.

FIG. 4D shows an illustration of an example of a hybrid round flexible cable of one embodiment of the present invention. The illustrative example shown in FIG. 4D shows a hybrid round flexible cable 440 shown flexing in both a horizontal and vertical plane along a device cable route of one embodiment of the present invention.

Figure 5:
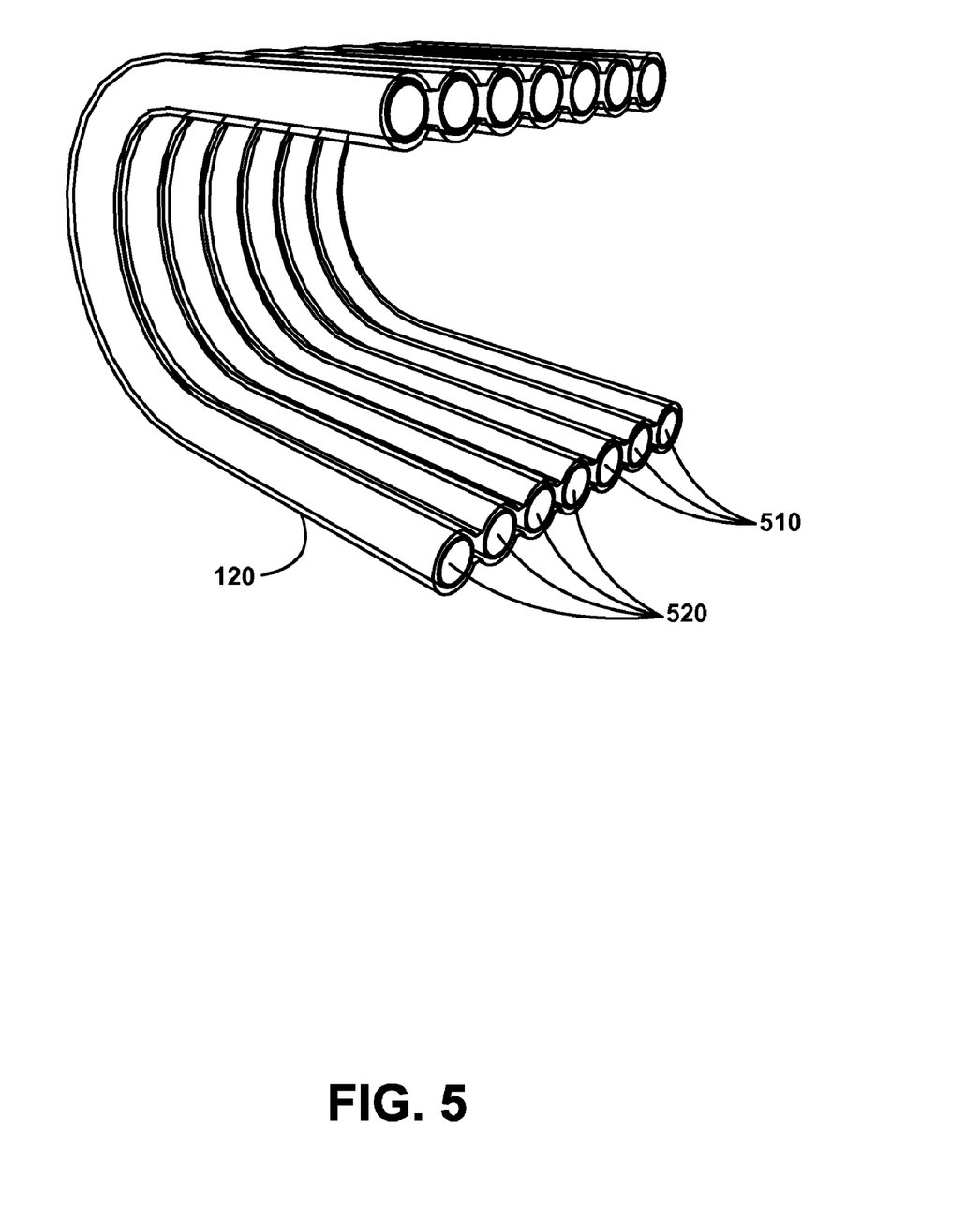
FIG. 5 shows an illustration of an example of a flexible silicone encased shaped cable of gas and fluid tubes of one embodiment of the present invention.

Shaped Cable of Gas and Fluid Tubes:

FIG. 5 shows an illustration of an example of a flexible silicone encased shaped cable of gas and fluid tubes of one embodiment of the present invention. The flexible silicone shaped encasement process 100 of FIG. 1 can be used to produce a flexible silicone shaped encasement 120 of groups of hollow tubes. FIG. 5 illustrates an example of a flexible silicone shaped cable of gas tubes 510 and fluid tubes 520 configured into a flexible flat cable thereby enabling all manner of liquids and gases to flow through the same flexible cable grouping of one embodiment of the present invention.

Figure 6A:
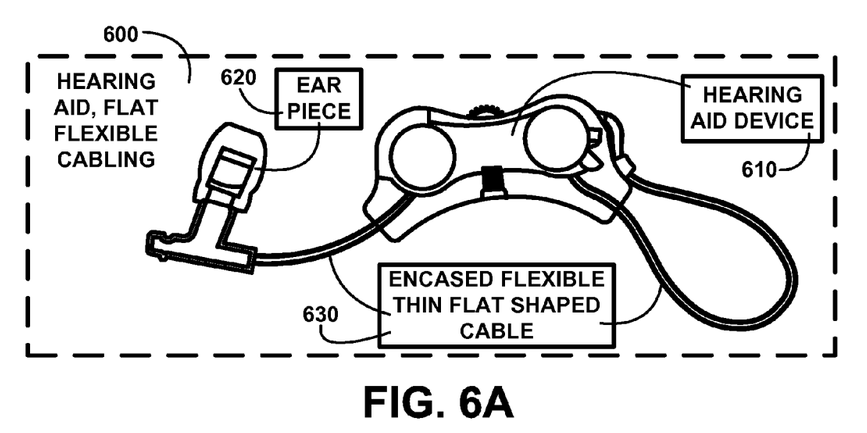
FIG. 6A shows an illustration of an example of flat flexible cable used in a hearing aid device of one embodiment of the present invention.
Figure 6B:
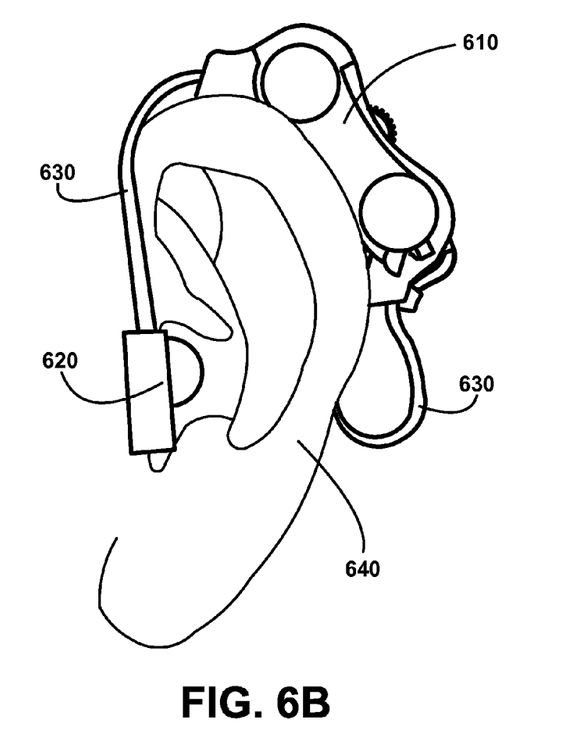
FIG. 6B shows an illustration of an example of flat flexible cable uses with a hearing aid worn on a human ear of one embodiment of the present invention.

Hearing Aid with Flat Flexible Cabling:

FIG. 6A and FIG. 6B illustrate an example of the use of flexible silicone encased shaped cables in a hearing aid application. FIG. 6A shows an illustration of an example of flat flexible cable uses in a hearing aid device of one embodiment of the present invention. FIG. 6A shows an illustration of an example of a hearing aid, flat flexible cabling 600. A hearing aid device 610 and ear piece 620 use an encased flexible thin flat shaped cable 630 to connect the component subsystems of the hearing aid device. The thin flexible flat cable for an adjustable hearing aid device contains finely-braided copper conductors for example between 30 AWG and 44 AWG. The base stranding of the wire conductors are finer than 50 AWG, creating a highly flexible conductor. The device holds the number of conductors desired for the operation, for example from 2 conductors up to 10 conductors. The conductors provide power and audio signals to and from the ear speaker amplifying device, and the sound capture, sound-producing and power unit of one embodiment of the present invention.

FIG. 6B shows an illustration of an example of flat flexible cable uses with a hearing aid worn on a human ear of one embodiment of the present invention. The illustrative example of the hearing aid, flat flexible cabling 600 is shown in FIG. 6B being worn on a human ear 640. The conductors are copper-colored, so as to be close to normal skin color. They are completely encased in translucent silicone, so the entire cable is not instantly visible against the human skin for example when placed on a human ear 640 of one embodiment of the present invention.

The encased flexible thin flat shaped cable 630 is water and sweat resistant, and it is completely inert, and therefore acceptable for use with a hearing aid device, in constant contact with human skin and hair. The cable, while flexible, is also strong enough to mechanically hold the earpiece, and also is strong enough to not break while being pulled to adjust the cable length and the ear piece 620 position to fit a person's ear. The cable has some friction, which allows the use of a friction-type holding pad system, for adjusting and maintaining the length of the cable protruding from the hearing aid device 610 unit. The cable length can be easily adjusted, using minimum force, and the cable will also stay in its set position, due to the friction between the brake pad material and the silicone cable of one embodiment of the present invention.

Figure 7A:
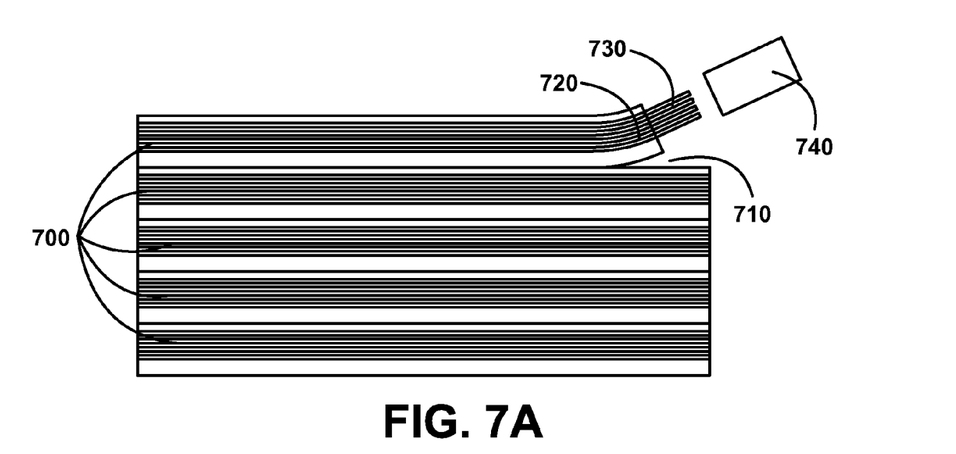
FIG. 7A shows an illustration of an example of a custom flexible cable installation of one embodiment of the present invention.

Custom Flexible Cable:

FIG. 7A shows an illustration of an example of a custom flexible cable installation of one embodiment of the present invention. The example flexible cable illustrated in FIG. 7A is made up of groupings of conductors which constitute cable pods 700. Individual cable pods 700 can be separated from the flexible cable by cutting a slit 710 in the silicone material separating the various cable pods 700. A separated cable pod 720 can be cut to an appropriate length to allow the separated cable pod 720 to have the silicone encasement stripped from the conductors 730. The separated cable pod 720 can be split again by way of a slit 710 in the silicone encasement between conductor cables and stacked to position the conductors for insertion into a cable terminating fitting 740 of one embodiment of the present invention.

Figure 7B:
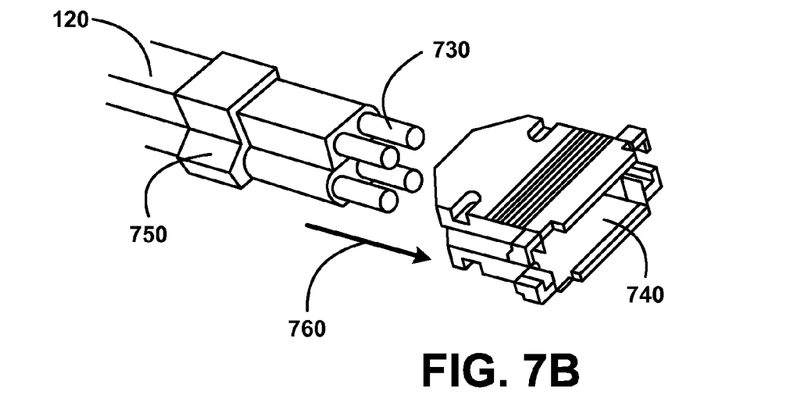
FIG. 7B shows an illustration of an example of inserting flexible cables into terminating fitting of one embodiment of the present invention.

FIG. 7B shows an illustration of an example of inserting cables into terminating fitting of one embodiment of the present invention. The stacked silicone encased cable sections can be held in place using a silicone stabilizer 750 that bonds the cable sections together. One example as a strap is shown in FIG. 7B for illustrative purposes. The silicone stabilizer 750 bonds the flexible silicone shaped encasement 120 leaving the conductors 730 that have had the silicone encasement stripped away free to be installed into a cable terminating fitting 740. Inserting stripped conductors into the cable terminating fitting 760 allows the cable terminating fitting 740 to be connected of one embodiment of the present invention.

Figure 7C:
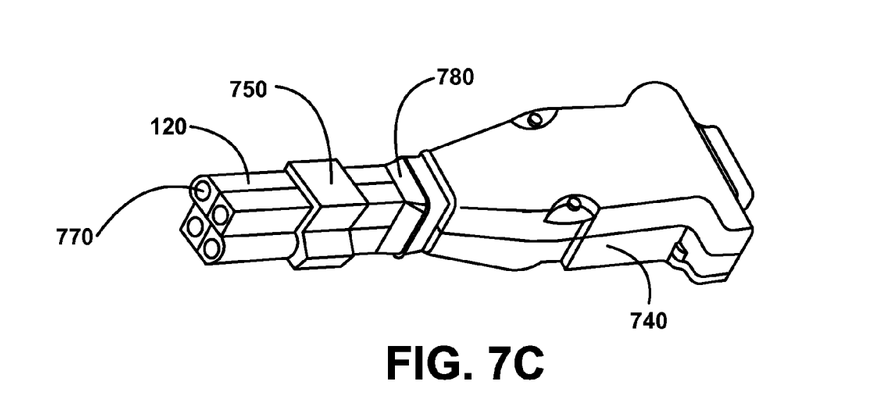
FIG. 7C shows an illustration of an example of a custom flexible cable with terminating fitting of one embodiment of the present invention.

FIG. 7C shows an illustration of an example of a custom flexible cable with terminating fitting of one embodiment of the present invention. Upon completion of the cable terminating fitting 740 connection the portion of the exposed conductors can be encased 770 with a silicone stress seal 780 to protect against contamination and reduce cable movement stress. Separation of individual cable pods 700 of FIG. 7A from the flexible silicone encased shaped cable assembly for connection to a cable terminating fitting 740 at a desired terminating point along the cable routing allows creation of a custom flexible cable to be adapted after installation to fit the desired application use of one embodiment of the present invention.

Figure 8:
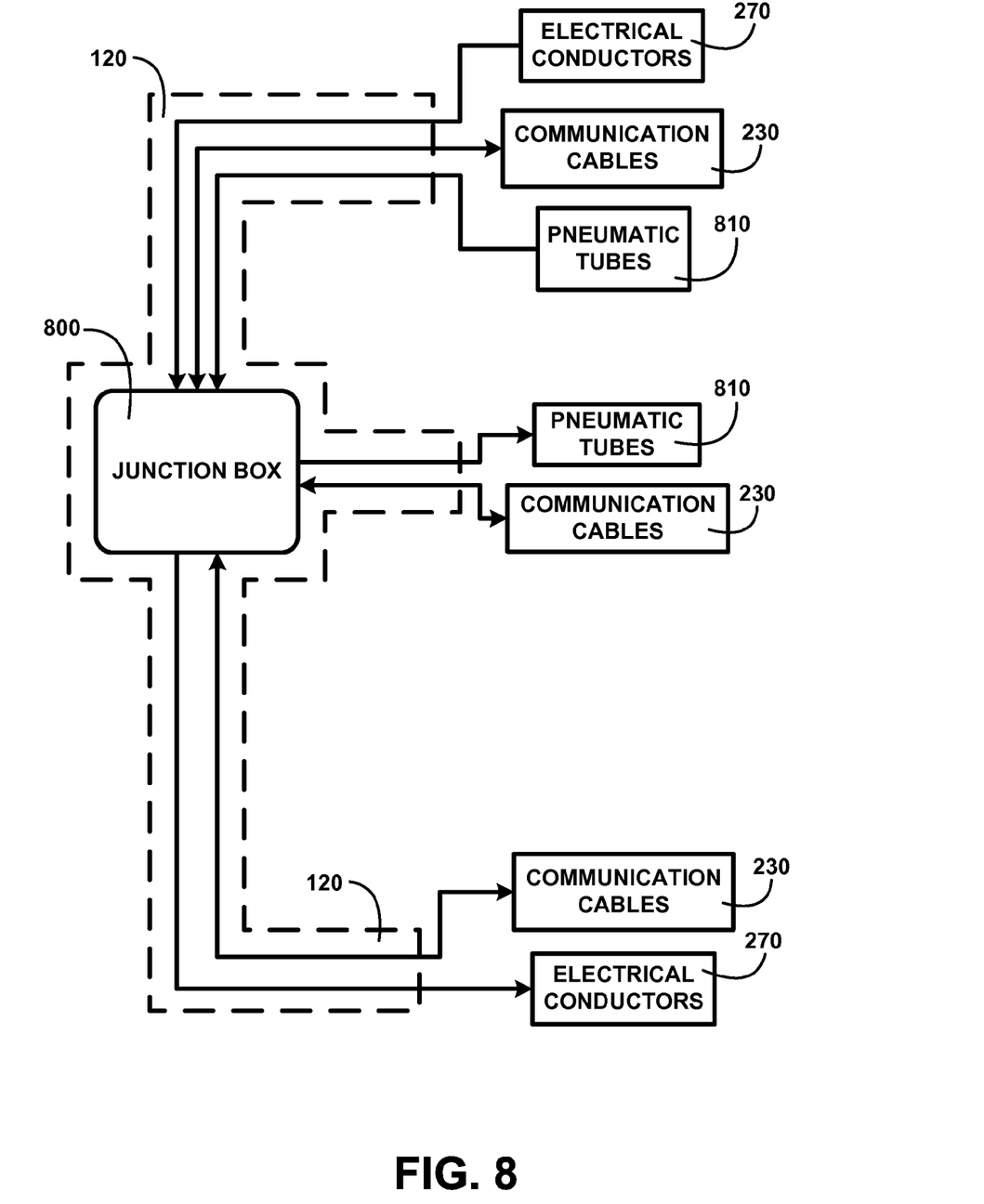
FIG. 8 shows an illustration of an example of flexible silicone shaped cables and flexible junction box assemblies of one embodiment of the present invention.

Encapsulated Flexible Junction Boxes:

FIG. 8 shows an illustration of an example of flexible silicone shaped cables and flexible junction box assemblies of one embodiment of the present invention. The flexible silicone shaped encasement process 100 of FIG. 1 includes the fabrication within the operation of the shaped silicone encasement extrusion equipment 110 of FIG. 1 of one or more flexible junction box 800 to be integrated along the length of the flexible silicone encased cable assemblies. The illustrative example of FIG. 8 shows communication cables 230, electrical conductors 270 and pneumatic tubes 810 in a flexible silicone shaped encasement 120. This cable assembly is routed to a flexible junction box 800. Two branch cables are routed from the flexible junction box 800. One branch includes communication cables 230 and electrical conductors 270 and the other branch communication cables 230 and pneumatic tubes 810. In this example the communication cables 230 can be control circuits which open and close valves for the pneumatic tubes 810 and operation of an electrical device independently or in concert with the flow from the pneumatic tubes 810 of one embodiment of the present invention. Also, strengthening members, such as ballistic materials and metallic wires can be added to the cable.

Electrical wiring, printed circuit boards and/or microprocessors can be encapsulated in a flexible junction box 800, which can be formed in virtually any shape, to conform to a specific purpose. The material of the flexible junction box 800 is a non-conductive, hard, yet flexible, epoxy. It fully contains and protects the electrical elements of the flexible junction box 800, against ingress from water, dirt, salt, and other fluids and gases. The flexible junction box 800 also provides strain relief protection for the electrical wires and connections. The flexible junction box 800 is slightly flexible, allowing it to move and be positioned into place, without cracking or breaking the flexible junction box 800. The flexible silicone encased cable assembly including the integrated flexible junction boxes with branch cables can be coiled for delivery and uncoiled for installation of one embodiment of the present invention.

Figure 9:
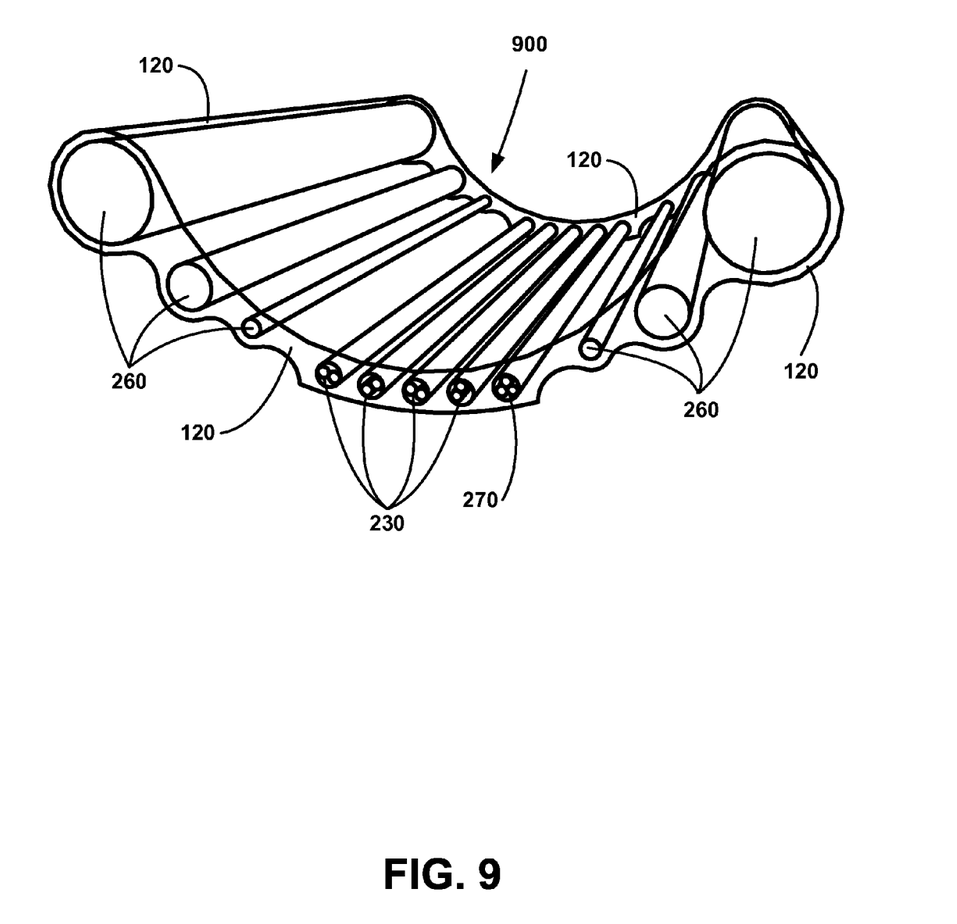
FIG. 9 shows an illustration of an example of a U shaped self supporting encased cable of one embodiment of the present invention.

U Shaped Self Supporting Encased Cable:

FIG. 9 shows an illustration of an example of a "U" shaped self supporting encased cable of one embodiment of the present invention. The illustration in FIG. 9 shows an example of a "U" shaped self supporting encased cable 900 that includes communication cables 230, electrical conductors 270 and various sizes of tubing 260 held in shape by the flexible silicone shaped encasement 120. The "U" shaped self supporting encased cable 900 is a curved cable shape. The cable shape, when facing it lengthwise, is a modified "U" shape. This shape gives the cable holding strength when the cable itself is unsupported, or in a cantilevered position of one embodiment of the present invention.

A flat silicone cable normally would not support itself, but the "U" shaped cable supports itself for a considerable distance, due to the "U" shaped geometry of the cable. This enables the "U" shaped self supporting encased cable 900 to be installed without in some instances having to be supported by another means in such an application. The "U" shape can be repeated during extrusion at predetermined lengths to extend the self-supporting features. Additionally, the "U" shaped cable displays a parallel form when it is rolling back and forth. The cable maintains a straight parallel form of the top and the bottom of the cable, during a flexing operation. This is due to the geometry of the "U" shaped cable, as a normal flat cable will 'bow' in a circle on the rolling end, and the shape will be more round than parallel. Even though the cable is "U" shaped, when it is rolled, it acts like a flat cable, so it can be easily spooled into a roll, and it flexes in the axial orientation as a flexible flat cable does of one embodiment of the present invention. When it is spooled, a secondary benefit of the "U" shape is that it easily spools on and off of a circular roll (like a tape measure), and the cantilever strengths of the "U" shape only take effect once the "U" shaped-cable rolls off of the spool. When on the spool, it behaves the same as a normal flat cable.

Figure 10A:
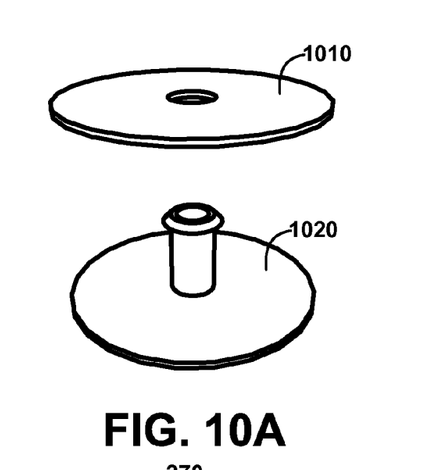
FIG. 10A shows an illustration of an example of a snap washer before assembly of one embodiment of the present invention.

Snap Washer:

FIG. 10A shows an illustration of an example of a snap washer before assembly of one embodiment of the present invention. Physical attachment of a flexible silicone systems encased flat shaped cable is desirable along cable routes for example a vertical section. Physical attachment can be accomplished by using a snap washer 1010 and a snap washer base 1020 shown before assembly in FIG. 10A of one embodiment of the present invention.

Figure 10B:
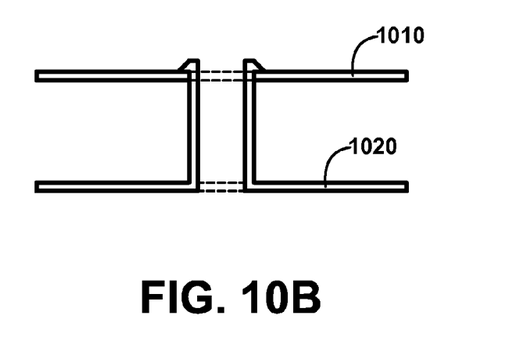
FIG. 10B shows an illustration of an example of a snap washer assembled of one embodiment of the present invention.

FIG. 10B shows an illustration of an example of a snap washer assembled of one embodiment of the present invention. The snap washer base 1020 provides a beveled lip at the end of the spacer cylinder used to lock the snap washer 1010 in place as shown after assembly in FIG. 10B of one embodiment of the present invention.

Figure 10C:
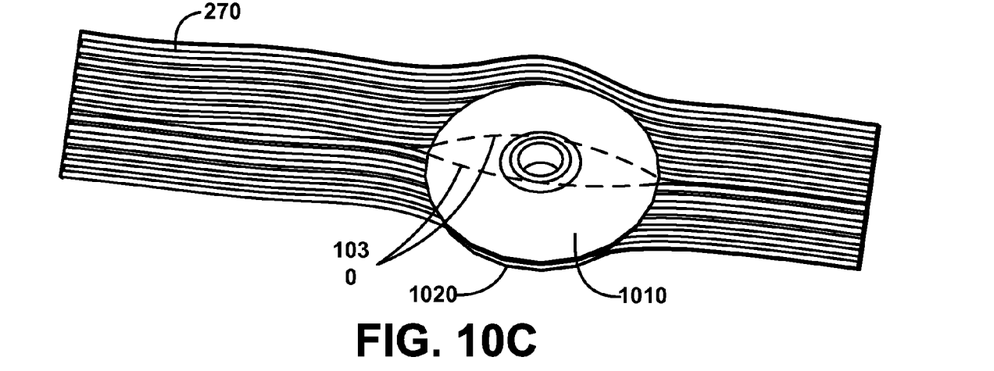
FIG. 10C shows an illustration of an example of a snap washer after cable slit installation of one embodiment of the present invention.

FIG. 10C shows an illustration of an example of a snap washer after cable slit installation of one embodiment of the present invention. FIG. 10C shows a flexible silicone systems encased flat shaped cable which has had a slit 1030 cut along the cable run of a thin flat cable 270. The snap washer base 1020 has been inserted through the slit 1030 in the thin flat cable 270 and the snap washer 1010 snapped into the locked position of one embodiment of the present invention.

Figure 10D:
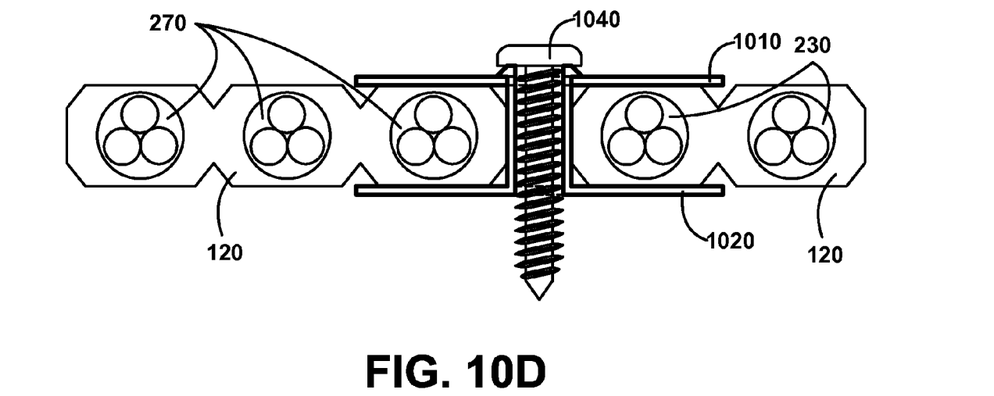
FIG. 10D shows an illustration of an example of a snap washer used for attachment of one embodiment of the present invention.

FIG. 10D shows an illustration of an example of a snap washer used for attachment of one embodiment of the present invention. FIG. 10D shows the physical attachment of the thin flat cable 270 using for example a screw 1040 as an attachment device. The thin flat cable 270 in this example includes communication cables 230 and electrical conductors 270. The slit 1030 has been cut along the flexible silicone shaped encasement 120 between conductors. The spacer cylinder of the snap washer base 1020 has been inserted through the slit 1030 and the snap washer 1010 lock in place. The screw 1040 is inserted through the spacer cylinder of the snap washer base 1020 and screwed into the device mounting surface of one embodiment of the present invention.

Figure 11:
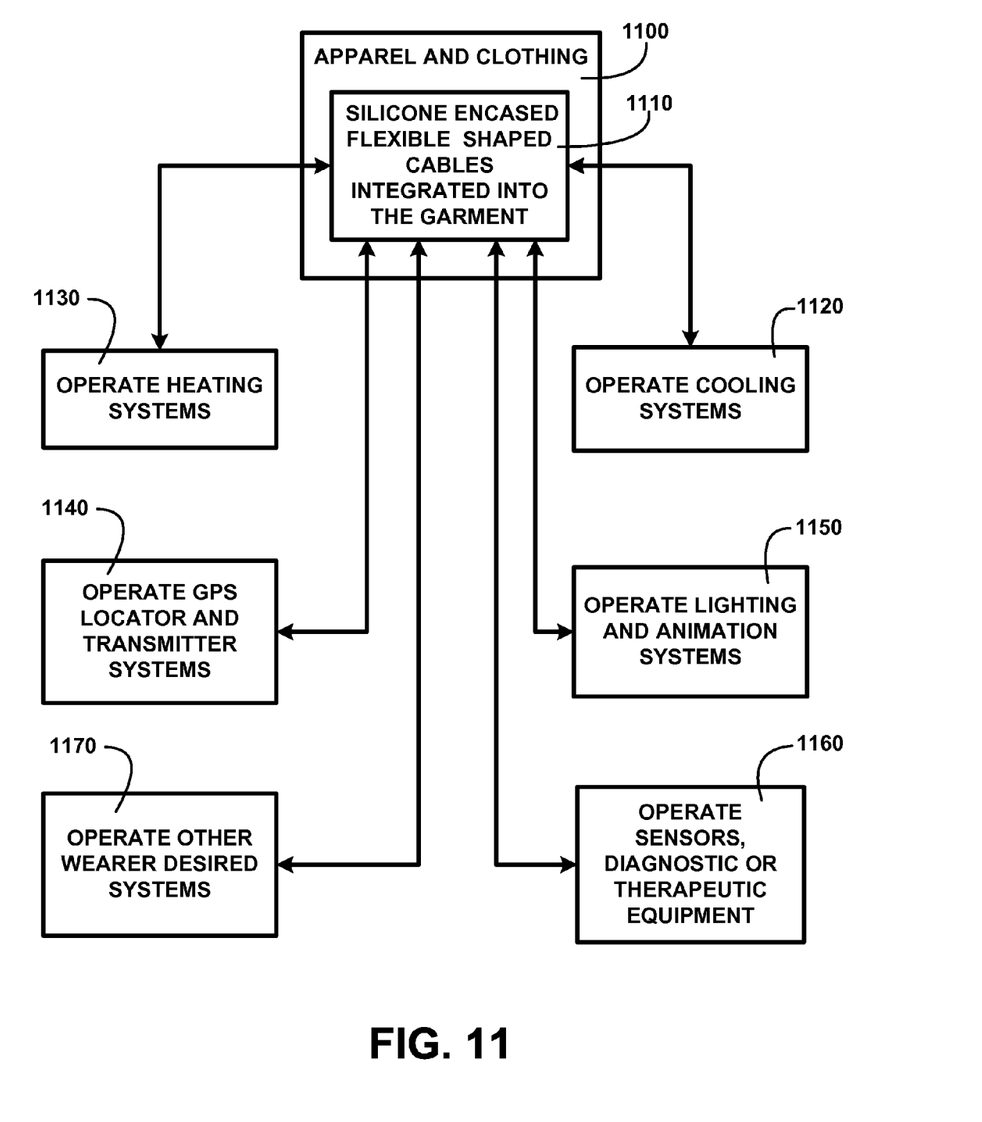
FIG. 11 shows a block diagram of examples silicone encased flexible shaped cables integrated into garments, wearing apparel and clothing of one embodiment of the present invention.

Silicone Encased Cables Integrated into Clothing or Other Apparel:

FIG. 11 shows a block diagram of examples of silicone encased flexible shaped cables integrated into garments, wearing apparel and clothing of one embodiment of the present invention. The advent of clothing in human development provided protection against the elements. FIG. 11 shows apparel and clothing 1100 in which silicone encased flexible shaped cables integrated into the garment 1110 will allow increased control of the protection against the elements and functionality to the use of clothing for the wearer of one embodiment of the present invention.

The flexible silicone shaped encasement 120 of FIG. 1 is completely inert and acceptable for use in contact with human skin, or as part of clothing. Silicone encased flexible shaped cables are lightweight and flexible, so as not to be cumbersome or heavy when incorporated into clothing. Silicone encased flexible shaped cables are non-flammable, and they operate at high temperatures, up to 260 degrees Celsius. Silicone encased flexible shaped cables are waterproof, and sweat proof, including salt water and human sweat. Incorporating one or more multiple individual flexible systems 140 of FIG. 1 in numbers of a single silicone encased flexible shaped cable 170 of FIG. 1 can enable operations of various functions to be incorporated safely and comfortably into the apparel and clothing 1100 of one embodiment of the present invention.

Increased control of the protection against the elements for example can be provided by using the silicone encased flexible shaped cables integrated into the garment 1110 to operate cooling systems 1120. The cooling system to pump coolant through the tubing 260 of FIG. 2 throughout the garments to an electrically operated pump, fan and radiator to provide the wearer with relief from the heat, such as military uniforms in desert conditions, fire-fighting garments to reduce exposure to overheating and in work clothing near blast furnaces in the steel industry and other environments where high temperatures increase heat stress. Garments can for example be enabled to operate heating systems 1130 in cold climates or conditions such as snow cover or commercial walk-in freezers reducing the need for multiple layers of bulky cold weather garments and coats which can inhibit agility of one embodiment of the present invention.

Silicone encased flexible shaped cables carry electrical conductors 270 of FIG. 2 and communication cables 230 of FIG. 2 can for example be sewn into apparel to provide circuits to operate GPS locator and transmitter systems 1140 to provide continuous location of critical personnel or hikers going into the wild. Miniaturized silicone encased flexible shaped cables can for example integrated into apparel to operate sensors, diagnostic or therapeutic equipment 1160 allowing monitoring and treatment of patients that can move about or may have to travel in areas remote from medical treatment. Silicone encased flexible shaped cables integrated into the garment 1110 for example that include optic fibers 240 of FIG. 2 to operate lighting and animation systems 1150 in animation apparel for theatres, theme parks, where electrical motors and signals are used to move and animate costumed characters with light emitting diodes for display. The use of silicone encased flexible shaped cables integrated into the garment 1110 that carry electrical circuits, communication signals and fluids/gases can add functionality to other applications to operate other wearer desired systems 1170 of one embodiment of the present invention. In addition, cloaking devices used to project images and aid in the concealment of people and equipment wearing the apparel can be integrated within the apparel.

In yet another embodiment, apparel with motion sensors can be inconspicuously integrated with the apparel through the silicone encased cabling for live action special effects creation for film and television. For example, infrared motion sensors can be incorporated into the silicone encased cabling for use with advanced video, computer vision and motion analysis systems for visually capturing precise motion and movement of the wearer of the apparel with the silicone cabling of the present invention for green screen/blue screen animation and special effects creation.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A method for creating a silicone encased flexible cable using manufacturing machinery, comprising:
   automatically arranging plural individual conduits, into a custom grouped arrangement, the individual conduits include electrical wiring, pneumatic tubing and fluid tubing;
   inserting the custom grouped arrangement into an extrusion apparatus configured to create a shaped silicone encasement of the custom grouped arrangement;
   depositing a mixture of silicone and additives to the custom grouped arrangement;
   customizing the mixture of silicone and additives to create differing characteristics of the individual conduits;
   using the extrusion apparatus to create a singular encasement and to cure the singular encasement to a desired shape of the custom grouped arrangement; and
   integrating a flexible junction box to the custom grouped arrangement, wherein the flexible junction box contains at least one incoming and one outgoing conduit connection and one or more functional devices connected to the junction box.

2. The method of claim 1, wherein the extrusion process using the shaped silicone encasement extrusion apparatus can produce silicone encased flexible shaped cables in continuous lengths or as assemblies, complete with connectors and flexible silicone junction devices.

3. The method of claim 1, wherein the assemblies of flexible silicone shaped cables and flexible silicone junction boxes includes at least communication cables, electrical conductors and pneumatic tubes routed into a flexible junction box and two branch cables are routed outgoing from the flexible junction box.

4. The method of claim 1, wherein the integrated flexible junction box is formed in a user defined custom shape to conform to a specific purpose.

5. The method of claim 1, wherein the integrated flexible junction box is formed in a user defined custom shape to conform to a specific purpose.

6. The method of claim 1, wherein automatically arranging plural individual conduits into a custom grouped arrangement further includes using at least one fluid communication conduit for transferring fluid through the cable and at least one electrical conduit for transferring electrical signals through the cable.

7. The method of claim 1, wherein the silicone encased custom grouped arrangements includes a hybrid round flexible cable and U shaped self-supporting cable.

8. The method of claim 1, wherein the depositing a mixture of silicone and additives wherein predetermined mixtures of silicon and graphite changes the encasement characteristics wherein the silicone encasement has a predetermined electrical conductivity.

9. The method of claim 1, wherein the plural individual conduits comprise at least pneumatic tubing, fluid tubing, gaseous tubing, multiple twisted conductors, shielded conductors, single conductor, fiber optics or coax.

\* \* \* \* \*